(12) United States Patent
Ruhl

(10) Patent No.: US 8,770,057 B2
(45) Date of Patent: Jul. 8, 2014

(54) DEVICE FOR EMERGENCY RELEASE OF AN AUTOMOTIVE PARKING INTERLOCK

(75) Inventor: Christian Ruhl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 338 days.

(21) Appl. No.: 12/840,418

(22) Filed: Jul. 21, 2010

(65) Prior Publication Data

US 2011/0030494 A1   Feb. 10, 2011

(30) Foreign Application Priority Data

Aug. 7, 2009   (DE) .......................... 10 2009 028 340

(51) Int. Cl.
*B60K 20/00* (2006.01)
*F16H 63/34* (2006.01)

(52) U.S. Cl.
CPC ................................ *F16H 63/3491* (2013.01)
USPC ..................................... 74/473.23; 74/473.24

(58) Field of Classification Search
USPC ........................................... 74/473.23, 89.23
See application file for complete search history.

(56) References Cited

U.S. PATENT DOCUMENTS

| | | | |
|---|---|---|---|
| 2,963,115 A | 6/1960 | Peras | |
| 3,116,815 A | 7/1964 | Chapman, Jr. | |
| 4,597,708 A * | 7/1986 | Wheeler et al. | 414/331.18 |
| 6,016,717 A * | 1/2000 | Wheeler | 74/473.12 |
| 6,161,447 A * | 12/2000 | Worner et al. | 74/473.21 |
| 6,179,108 B1 | 1/2001 | Gierer et al. | |
| 6,345,945 B1 * | 2/2002 | Hildebrandt | 411/369 |
| 6,481,556 B1 | 11/2002 | Haupt | |
| 6,533,705 B1 | 3/2003 | Giefer et al. | |
| 6,631,654 B2 * | 10/2003 | Ehrmaier et al. | 74/473.15 |
| 6,637,281 B2 * | 10/2003 | Yamamoto | 74/335 |
| 6,684,831 B2 * | 2/2004 | Grau | 123/90.16 |
| 6,793,091 B2 * | 9/2004 | Hagano et al. | 220/304 |
| 7,082,851 B2 * | 8/2006 | Whitmarsh et al. | 74/473.11 |

(Continued)

FOREIGN PATENT DOCUMENTS

| | | |
|---|---|---|
| DE | 4317257 C1 | 5/1994 |
| DE | 43 22 523 A1 | 1/1995 |

(Continued)

OTHER PUBLICATIONS http://bluecoat-01/?cfru=aHR0cDovL3d3dy5iaW1tZXJmZXN0LmNvbS9mb3J1bXMvYXR0YWNobWVudC5waHA/YXR0YWNobWVudGlkPTI4NjYxMyZkPTEzMTE2OTU3Mzk=; E70 Life Cycle Impulse (LCI) Revision date:Apr. 2010 pp. 1-16.*

*Primary Examiner* — Troy Chambers
*Assistant Examiner* — Zakaria Elahmadi
(74) *Attorney, Agent, or Firm* — Davis & Bujold, PLLC; Michael J. Bujold

(57) ABSTRACT

The mechanism for emergency release of a parking lock of an automatic transmission. The mechanism comprises and is connected, in a rotationally fixed manner, with the selector shaft (1) of the shifting device of the transmission. A lever (2), which is positioned facing the transmission housing (3), at the side of the shifting device, can be activated by an unlocking tool (5) that is inserted from the outside through an opening (4) in the transmission housing (3) to release the parking lock.

9 Claims, 4 Drawing Sheets

(56) References Cited

U.S. PATENT DOCUMENTS

| | | | |
|---|---|---|---|
| 7,779,715 B2* | 8/2010 | Mitteer | 74/473.23 |
| 8,104,599 B2* | 1/2012 | Jung et al. | 192/220.2 |
| 2001/0006009 A1 | 7/2001 | Ehrmaier et al. | |
| 2006/0060019 A1* | 3/2006 | Sato et al. | 74/473.23 |
| 2006/0101930 A1* | 5/2006 | Mock | 74/89.23 |
| 2006/0169862 A1* | 8/2006 | Liu | 248/422 |
| 2007/0137331 A1* | 6/2007 | Kachouh | 74/89.23 |
| 2008/0277236 A1 | 11/2008 | Ruhringer et al. | |
| 2009/0249914 A1* | 10/2009 | Kashiwai et al. | 74/473.21 |
| 2011/0061481 A1* | 3/2011 | Zimmermann | 74/89.23 |
| 2011/0252904 A1* | 10/2011 | Sun et al. | 74/89.23 |

FOREIGN PATENT DOCUMENTS

| | | |
|---|---|---|
| DE | 196 43 303 A1 | 4/1998 |
| DE | 196 43 304 A1 | 4/1998 |
| DE | 198 34 074 A1 | 7/1998 |
| DE | 198 37 832 A1 | 8/1998 |
| DE | 198 48 733 A1 | 10/1998 |
| DE | 199 62 243 A1 | 12/1999 |
| DE | 101 05 637 A1 | 2/2001 |
| DE | 10 2004 030 006 | 6/2004 |
| EP | 1 519 086 A2 | 3/2005 |

\* cited by examiner

DEVICE FOR EMERGENCY RELEASE OF AN AUTOMOTIVE PARKING INTERLOCK

This application claims priority from German patent application serial no. 10 2009 028 340.4 filed Aug. 7, 2009.

FIELD OF THE INVENTION

The invention relates to a mechanism used for emergency release of a parking lock of an automatic transmission in a motor vehicle.

BACKGROUND OF THE INVENTION

In case of a breakdown of a motor vehicle, especially in the case when certain defects affect the drive train in a way that the hydraulic pressure cannot establish itself in the automatic transmission, the parking lock, as a general rule, is automatically activated. It is necessary, for the purpose of the recovery or the relocation of the concerned vehicle, to deactivate the automatically activated parking lock, which usually takes place manually by trained personnel, using special tools, certain kinematics, and forced power activated systems.

In accordance with the state of the art, the activating systems for an emergency release of the parking lock in an automatic transmission are positioned in the transmission, as well as in the vehicle, such that their integration into the drive train has significant limitations, especially in regard to the required installation space and the design options of the drive train and its surrounding chassis contour.

A shifting mechanism is known through DE 4317257 C1 and comprises an electric motor which is used for activation of the selector slide, spring energy is used to engage the parking lock, as well as a mechanical emergency release which can be operated by the driver in case of a breakdown of a hydraulically operated parking lock release, by way of the lock bar, the parking lock is activated via a specially designed connectivity rod which has a guiding groove.

A parking lock of an electro-hydraulic control mechanism of an automatic transmission is also known to the applicant through DE 4322523 A1, which can be engaged via spring energy and can be disengaged by means of oil pressure, by way of a mechanical emergency release mechanism, comprising a lever, mechanically coupled with the parking lock, which can be operated by the driver through a Bowden cable for the emergency release of the parking lock.

The applicant is aware, through DE 19643303 A1, of an emergency release mechanism for a parking lock which comprises a spring energy store in which the energy can be released via rotation of the ignition key in the ignition lock of the vehicle, to release the parking lock.

In addition and through DE 19643304 A1, the applicant is aware of an emergency release mechanism of a parking lock, which is operated via the already present brake of the vehicle. Also, through DE 19643812 A1, the applicant has knowledge of a parking lock of an automatic transmission, in which an electronic transmission control device determines, via an electromagnetic valve, the position of a spring load, whereby the spring load is mechanically linked with a parking handle and with an emergency release.

In accordance with the description in DE 19834074 A1, the applicant is aware of a device for the release of a parking lock for an automatic transmission, in which the parking lock is activated via a spring load and again deactivated via the transmission control by means of the system pressure, whereby, in case of a failure of the system pressure or the failing transmission control, the parking lock can be released via a pump from within the passenger compartment, by activating a lever, preferably the hand brake lever.

Known to the applicant through DE 19837832 A1 is a parking lock with an emergency release mechanism, which comprises a manual activating mechanism, which rotates an emergency release disc in such a way that a pin causes the rotation of the detent disc and thereafter engages into a lock which keeps the parking lock in the released position.

Also, known to the applicant through DE 19848733 A1 is a mechanism for the emergency release of a parking lock, whereby the parking lock is released by the activation of an externally accessible towing device, which resides outside of the motor vehicle, and the related axial movement of the operational connection between the towing device and a release mechanism at the transmission.

Known to the applicant through DE102004030006 A1 is a linear piston system for the hydraulic release of a parking lock under normal operation, with a holding magnet, or an electromagnetically securable locking mechanism respectively, to hold the piston, or the piston rod respectively, in a locked position, as well as with a manually activated emergency activating mechanism to lock and to unlock, from the outside, the parking lock in an emergency operation, whereby the emergency activating mechanism interacts with a sloping groove, and simultaneously moves the piston rod axial, when activating the emergency mechanism coaxially to the piston rod, and thereby rotates by a defined angle and locks into the associated end position. Additional mechanisms for emergency the release of a parking lock of an automatic transmission are mentioned, for example, U.S. Pat. Nos. 3,116,815 A and 2,963,115 A.

Also, a drive step selecting mechanism arises from the DE 19962243 A1, for selecting at least the automatic transmission operating steps "D", "N", "R", "P" of an automatic motor vehicle transmission, which can be selected by the driver via a control mechanism and which will be engaged through a transmission control mechanism which drives an electro hydraulic actuator, whereby an engaged parking lock, in the operating position "P", can be disengaged by the driver via an operating mechanism, in particular a hand lever, which actuates a release mechanism in the automatic transmission enclosure. The operating mechanism is connected, via a Bowden cable, with the release lever of the release mechanism, which is firmly installed on an axle which, during engagement and disengagement of the parking lock, rotates back and forth due to the electro-hydraulic actuating devices and thus pivots the unlocking lever back and forth. In addition and in accordance with DE 19962243 A1, the pivoting motion of the unlocking lever is not transmitted to the Bowden cable because the unlocking lever can move along its stranded Bowden wire which it is hooked to; a form fit between the stranded Bowden wire and the unlock lever, through a thickened area of the stranded Bowden wire, is only achieved when the operating mechanism is actuated.

SUMMARY OF THE INVENTION

It is the task of this invention to create a mechanism for the emergency release of a parking lock of an automatic transmission of a motor vehicle, which has just a few parts and which needs only little installation space.

Thus, a mechanism for the emergency release of a parking lock of an automatic transmission is proposed which comprises a lever, that is connected in a rotationally fixed manner with a selector shaft of the shifting mechanism of the transmission, where the lever is positioned at the shifting mechanism, facing the housing, which can be actuated to release the parking lock, from the outside, by means of an unlocking tool which is inserted into a respective opening of the transmission enclosure.

Preferably, the unlocking tool is designed as a threaded pin with an outside thread which can be screwed into an opening of the housing which has a through-thread, designed such in a way that the end, facing the lever, causes the lever to rotate, whereby, after a certain angle of rotation of the lever, the inner kinematic of the parking lock is positioned in a way such that the parking lock is deactivated.

The unlocking tool can advantageously be stored in the onboard toolbox of a motor vehicle which is equipped with an automatic transmission. The access for releasing of the parking lock generally takes place via the bottom of the motor vehicle, whereby, if an underbody protection cover is provided in the area of the preferably threaded-through opening of the enclosure, the service cover is provided which can be removed with a standard tool and which enables the access to the threaded-through opening of the transmission enclosure.

The inventive concept presents and provides a mechanism for the emergency release of a parking lock of an automatic transmission where the required installation space and required parts are reduced to minimum and no further parts are required in regard to the vehicle.

BRIEF DESCRIPTION OF THE DRAWINGS

In the following, the invention is further explained with reference to the attached drawings which show.

DETAILED DESCRIPTION OF THE PREFERRED EMBODIMENTS

Figure 1:
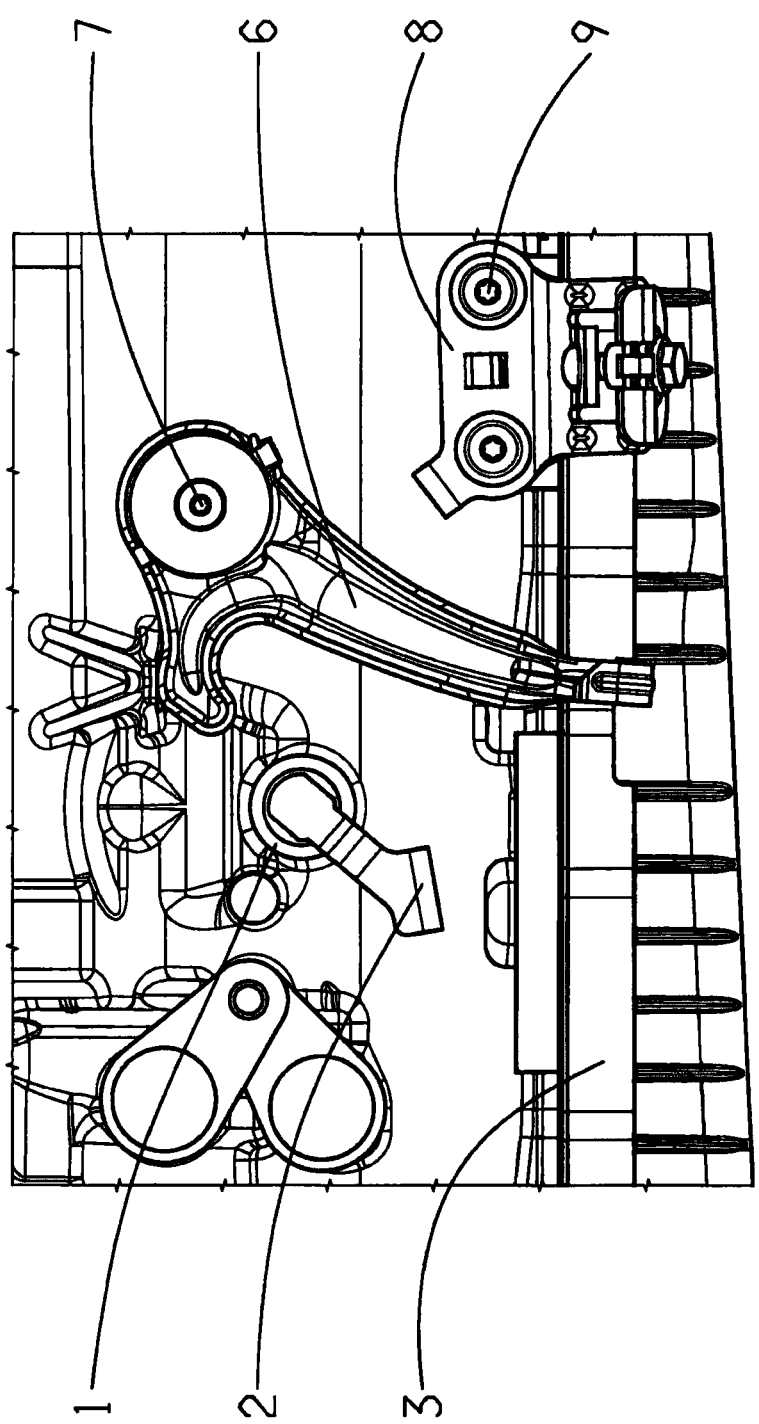
FIG. 1 a sectional view of portion of the automatic transmission for illustration of the positioned parts in the transmission and the inventive mechanism for the emergency release of a parking lock of an automatic transmission, the parts of the emergency release of a parking lock, in accordance with the state of the art, are also presented.

In accordance with the invention and in reference to FIG. 1, the mechanism for the emergency release of a parking lock of an automatic transmission, according to the invention, comprises a lever 2, connected in a rotationally fixed manner with the selector shaft 1 of the shifting mechanism of the transmission, that is positioned at the side of the shifting mechanism facing the housing 3.

Figure 2:
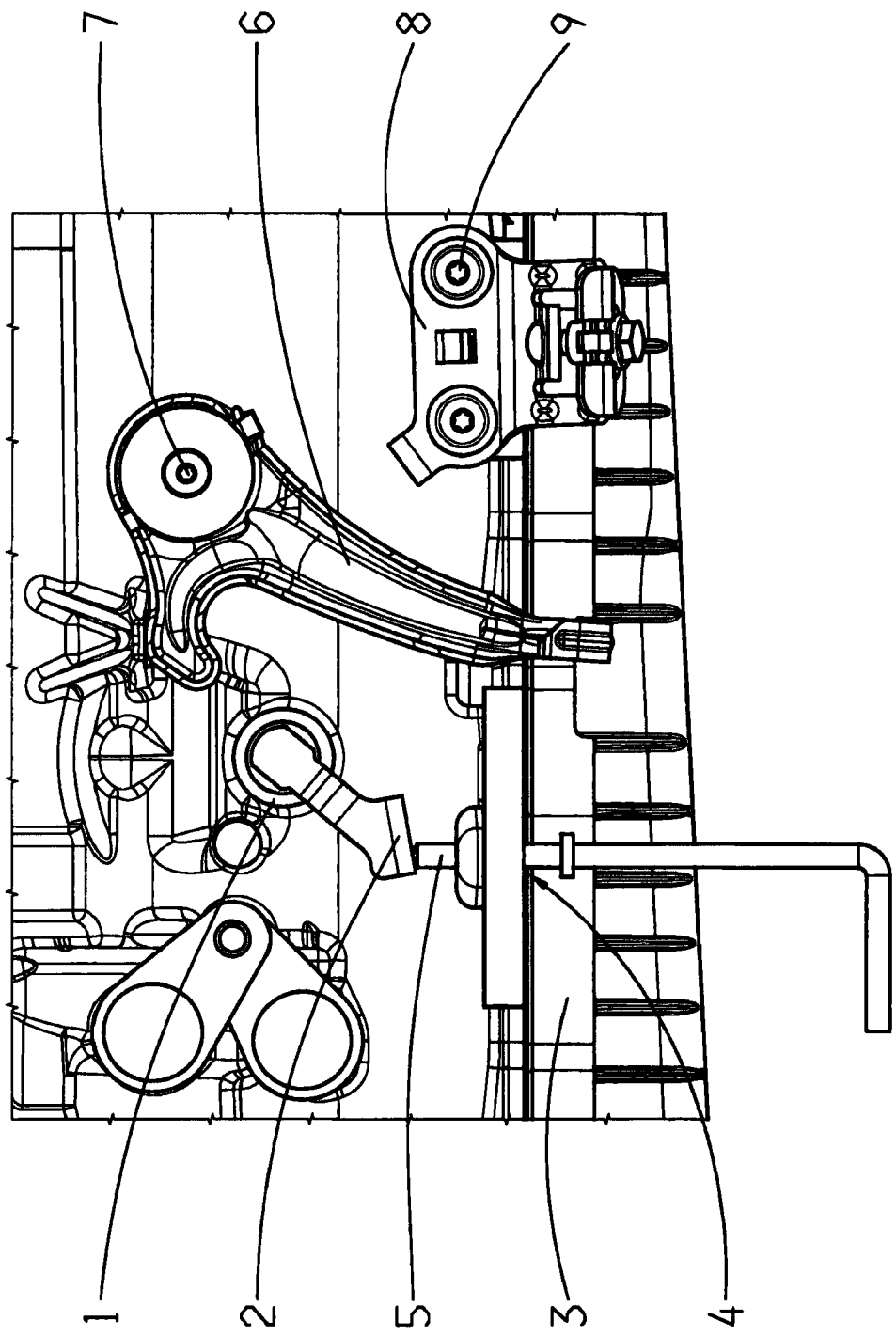
FIG. 2 a schematic sectional view of a portion of an automatic transmission as shown in FIG. 1 and the inventive unlocking tool in a non-deactivated condition of the parking lock.
Figure 3:
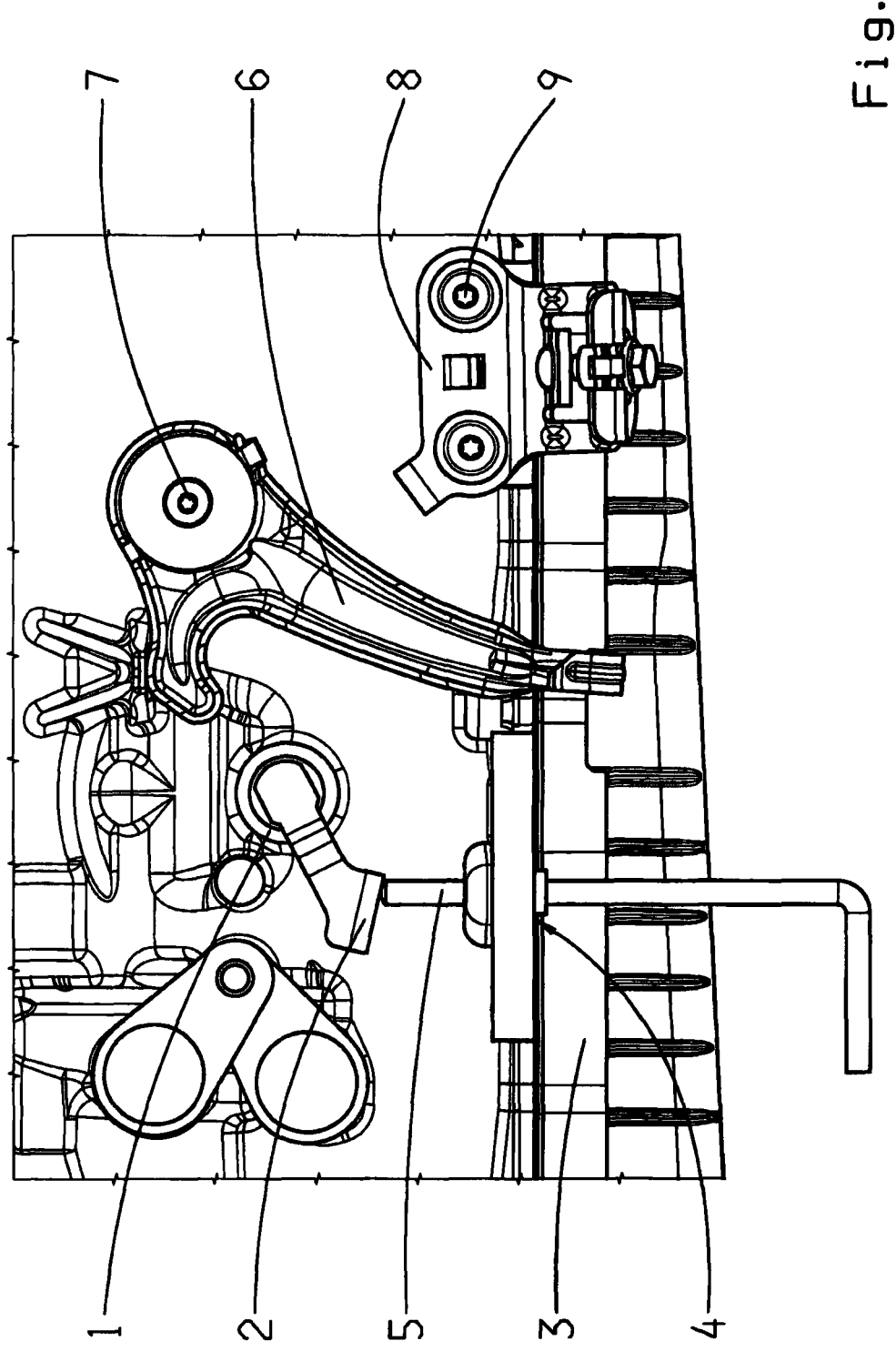
FIG. 3 a schematic sectional view of a portion of an automatic transmission as shown in FIG. 1 and the inventive unlocking tool in the deactivated condition of the parking lock.
Figure 4:
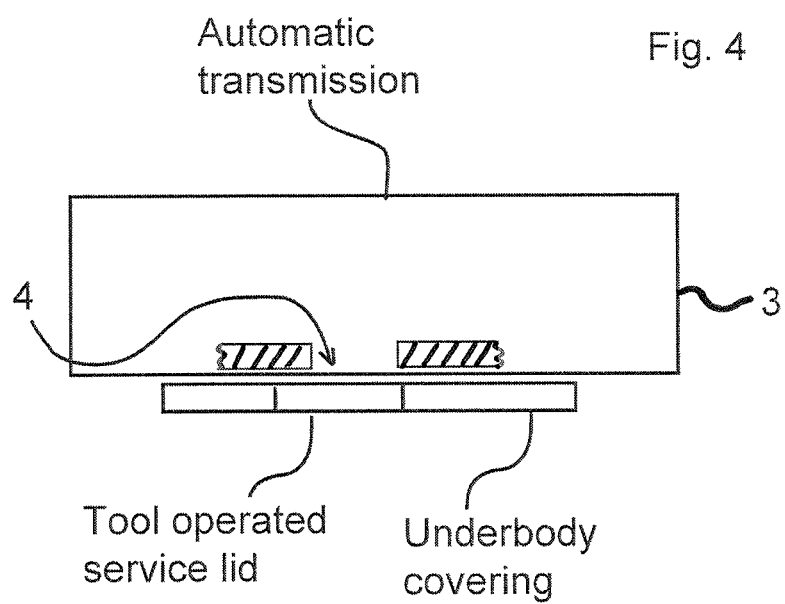
FIG. 4 is a diagrammatic view of an automatic transmission with an underbody covering and a tool operated service lid diagrammatically shown.
Figure 5:
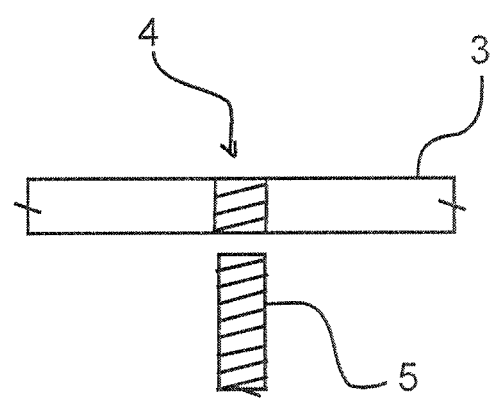
FIG. 5 is a diagrammatic view showing threaded portion of the unlocking tool and the mating threaded opening.

The lever 2, in accordance with the invention, can be operated for the purpose of releasing the parking lock, when the combustion engine has stopped and the hydraulic system does not provide pressure, by means of an unlocking tool 5, inserted from the outside into a provided opening 4 of the transmission housing 3, as seen in FIG. 2 and FIG. 3. The selector lever resides here in the position P.

In the presented embodiment examples in FIG. 2 and FIG. 3, the unlocked tool 5 is designed as a threaded pin with an outside thread, which can be screwed into a provided opening 4, which is designed with a through thread, of the enclosure 3. Hereby, the end of the threaded pin 5, facing the lever 2, activates the lever 2 into a rotational movement, so that, at a certain angle of rotation of the lever 2, the inner kinematic of the parking lock is positioned in a way so that the parking lock becomes deactivated.

The mechanism shown in FIG. 2 for the emergency release of a parking lock of an automatic transmission is in a state in which the unlocking tool 5 is inserted and turned to a point where it's end facing the lever 2 touches the lever 2.

If the unlocking tool 5 is screwed in further, the lever 2, via the threaded end facing the lever 2, is rotated such that, at a certain rotational angle, the parking lock becomes unlocked, as shown in FIG. 3.

FIG. 1 to FIG. 3 show the mechanism for an emergency release of a parking lock with parts in accordance with the state of the art, such as a release lever 6 which can be activated via a Bowden cable, not shown, where the unlock lever 6 is pivotally positioned on a pin at the housing side and which is secured by means of a screw 7. The mechanism for the emergency release of a parking lock, further comprises a part 8, known in the state of the art, which functions as an abutment for the Bowden cable and is fixed by means of two screws 9 in the shown example.

Based on the inventive concept, these parts can be advantageously eliminated which results in a reduction of the manufacturing cost, installation cost, and amount of installation space needed.

REFERENCE CHARACTERS

1 Selector Shaft
2 Lever
3 Housing
4 Opening
5 Unlocking Tool
6 Release Lever
7 Screw
8 Abutment
9 Screw

The invention claimed is:

1. An automatic transmission parking lock emergency release mechanism being accommodated within an automatic transmission, and the automatic transmission including a shifting device with a selector shaft (1), the emergency release mechanism comprising a lever (2) being connected, in a rotationally fixed manner, to the selector shaft (1) of the shifting device of the automatic transmission and the lever (2) being positioned adjacent a side of a transmission housing (3), and the lever (2) is accommodated outside the transmission housing;

a pivotable end of the lever (2) being positioned directly facing and adjacent an opening (4) in the transmission housing (3) adjacent a side of the shifting device: and the pivotable end of the lever (2) being activatable by direct engagement with a leading end of a rotatable unlocking tool (5) to facilitate release of the parking lock, and the rotatable unlocking tool (5) only being inserted through the opening of the transmission housing (3), from outside of the transmission housing (3), so as to directly engage with and push the pivotable end of the lever (2)

away from the opening (4) and releases the parking lock when emergency release of the parking lock is desired, and rotation of the rotatable unlocking tool (5), relative to the opening (4) of the transmission housing (3), further inserts the leading end of the unlocking tool through the opening (4) and induces engagement with and pushes the pivotable end of the lever (2) and causes rotation of the pivotable end of the lever (2) away from the opening (4) which releases the parking lock.

2. The automatic transmission parking lock emergency release mechanism according to claim 1, further comprising that the unlocking tool (5) is a threaded pin which has an external thread that can be screwed into the opening (4) of the transmission housing (3) which is provided a mating thread so that an end of the threaded pin (5), adjacent the lever (2), causes a rotational motion of the lever (2) whereby, after rotation of the lever by a certain angle, the parking lock is released.

3. The automatic transmission parking lock emergency release mechanism according to claim 1, further comprising that the opening (4) of the transmission housing (3) is located adjacent a vertically lower portion of a vehicle which incorporates the transmission, and an underbody covering is provided, in an area of the opening (4), and the underbody cover has a tool operated service lid to enable the access to the opening (4) of the transmission enclosure.

4. An automatic transmission parking lock emergency release mechanism, the mechanism comprising:

a lever (2) being accommodated outside a transmission housing and supported by and being located adjacent a side of the transmission housing (3) of the automatic transmission, and the lever (2) being connected, in a rotationally fixed manner, to a selector shaft (1) of a shifting device while a pivotable end of the lever (2) being normally unconnected with an unlocking tool (5), the lever (2) facing a threaded opening (4) of the transmission housing (3), the threaded opening (4) of the transmission housing (3) facilitates direct engagement of and pushing of the pivotable end of the lever (2) with a leading end of the unlocking tool (5) having a mating threaded exterior, and the threaded opening (4) in the transmission housing (3) being aligned with the pivotable end of the lever (2) such that, only when the unlocking tool (5) is threaded into and through the threaded opening (4) of the transmission housing (3), the unlocking tool (5) directly contacts and pushes the pivotable end of the lever (2) and pivots the lever (2) away from the opening (4) to a desired angle of rotation which rotates and deactivates the parking lock.

5. The automatic transmission parking lock emergency release mechanism according to claim 4, wherein an underbody covering covers the threaded opening (4) and comprises a service lid which facilitates access to the threaded opening (4) of the transmission housing (3).

6. The automatic transmission parking lock emergency release mechanism according to claim 4, wherein the pivot force, exerted on the lever (2), is provided without a Bowden cable.

7. The automatic transmission parking lock emergency release mechanism according to claim 1, wherein the unlocking tool (5) is removable and facilitates accesses to the inside the transmission housing (3) from outside the transmission.

8. The automatic transmission parking lock emergency release mechanism according to claim 1, wherein the unlocking tool (5) is normally located out of engagement with the threaded opening (4) and exerts a pushing force on the lever (2) to release the parking lock only when engaged with the threaded opening (4).

9. An automatic transmission parking lock emergency release mechanism, the mechanism comprising:

a lever (2) being supported by and located adjacent a side of a transmission housing (3) of the automatic transmission and being connected, in a rotationally fixed manner, to a selector shaft (1) of a shifting device while a pivotable end of the lever (2) being normally completely disconnected with an unlocking tool (5), and the lever (2) being accommodated outside the transmission housing the pivotable end of the lever (2) facing a threaded opening (4) of the transmission housing (3), the threaded opening (4) of the transmission housing (3) facilitating direct engagement of the pivotable end of the lever (2) with a leading threaded end of the unlocking tool (5), and the pivotable end of the lever (2) being aligned with the threaded opening (4) to facilitate a pivoting movement of the lever, away from the threaded opening due to engagement with the leading end of the unlocking tool (5), and actuation of the lever (2), and the threaded opening (4) in the transmission housing (3) being located closely adjacent and aligned with the pivotable end of the lever (2) such that only when the leading end of the unlocking tool (5) is threaded into and through the threaded opening (4), located outside of the transmission housing (3) rotation of the unlocking tool (5), relative to the threaded opening (4), causing the leading end of the unlocking tool (5) to be brought into direct contact with and push the pivotable end of the lever (2) and pivot the lever (2) away from the threaded opening to a desired angle of rotation which deactivates the parking lock.

\* \* \* \* \*